F. C. S. KNOWLES.
REAR SIGNAL DEVICE FOR VEHICLES.
APPLICATION FILED JUNE 28, 1920.
1,393,291.
Patented Oct. 11, 1921.
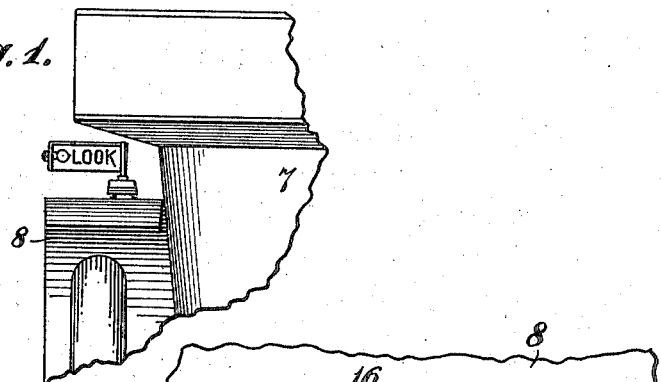
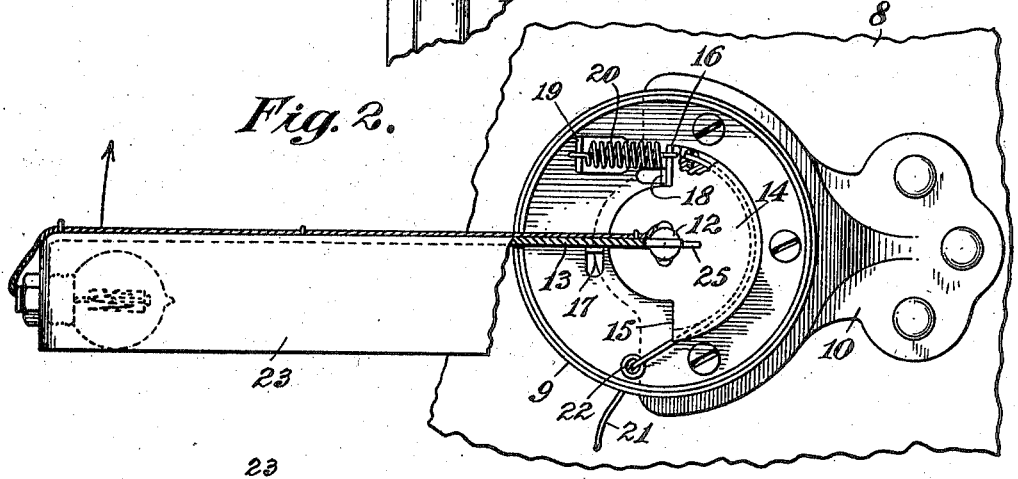
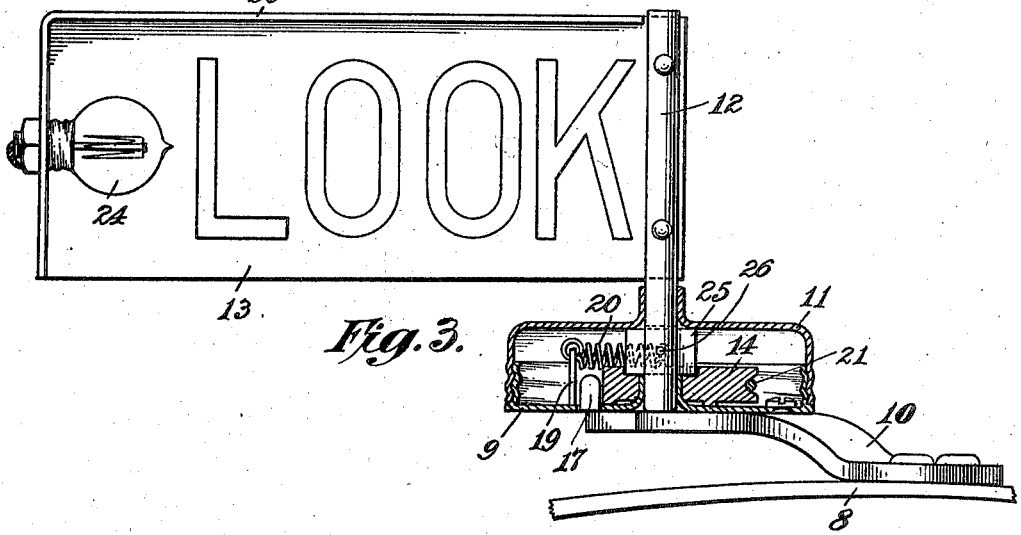
Inventor
Frederick C. S. Knowles,
By his Attorney

UNITED STATES PATENT OFFICE.

FREDERICK C. S. KNOWLES, OF FREEPORT, NEW YORK.

REAR SIGNAL DEVICE FOR VEHICLES.

1,393,291. Specification of Letters Patent. Patented Oct. 11, 1921.

Application filed June 28, 1920. Serial No. 392,394.

*To all whom it may concern:*

Be it known that I, FREDERICK C. S. KNOWLES, a citizen of the United States, residing at Freeport, in the county of Nassau and State of New York, have invented certain new and useful Improvements in Rear Signaling Devices for Vehicles, of which the following is a specification.

This invention relates generally to signaling devices for use in connection with vehicles, with more particular reference to signals so located as to be made clearly and conspicuously visible, when desired, under all ordinary conditions, from the rear of the vehicle and readily and quickly operated by the driver or chauffeur to indicate a contemplated change in speed or direction for the purpose of imparting to the driver or chauffeur of a following vehicle the necessity for the exercise of caution.

Many different kinds and types of mechanically and electrically operated signals for this purpose have been devised, but so far as I am aware none has come into general practical use. That some manner of signaling to the rear is essential to a reasonable degree of safety, particularly in crowded thoroughfares and still more particularly in connection with the driving of comparatively high-power and high-speed automobiles, is evidenced by the almost universal practice of extending the arm of an occupant of the vehicle when about to turn, slow down or stop, a more or less unsatisfactory method of signaling at best for many reasons, not least among which is the fact that under certain conditions there may not be enough light to enable the signal to be seen, or the relative positions of two vehicles may be such as to render such signal invisible, to say nothing of the fact that many modern so-called "closed cars" are so constructed that the chauffeur's seat is also inclosed and it would be impossible for any occupant of the car to signal in such manner.

That neither mechanically nor electrically operated signaling devices for the purpose set forth have not come into more general use would seem to have been due to one or another of a number of reasons. Some are not dependable, and are therefore worse than useless. Others are too clumsy or cumbersome or unsightly. Others are too elaborate, and therefore too expensive to attract the average automobile owner. The object of the present invention is the provision of a simple—and therefore comparatively inexpensive—and dependable signaling device of the character to which I have referred, capable of being made significantly visible from the rear of the vehicle under all ordinary conditions, readily and quickly operated from the seat of the driver or chauffeur, and so constructed and mounted as not to be unsightly or detract in any manner from the desired symmetrical and otherwise pleasing appearance of the vehicle.

In my efforts to simplify, I have taken into consideration that it is not so important that the driver of a following car be informed as to just what the driver of a leading car proposes to do as it is that the former be made aware that "something different" is about to be done and thus be put on his guard. In other words, however much more convenient it might be to the driver of a following car to know whether the leading car was to be turned to the right or to the left, or the speed thereof reduced, or the car stopped, it is only essential that he be advised of the necessity of putting his own machine under immediate control. Therefore, the signaling device of my invention involves in operation the manipulating of a single symbol of general warning significance.

My invention will be more readily understood by reference to the accompanying drawings, forming a part of this specification, in which—

Figure 1 is a fragmentary rear-end view of a motor vehicle equipped with a signaling device embodying my invention;

Fig. 2 is an enlarged top plan view of the device, partly in section and with the upper portion of the shell or casing for the actuating mechanism removed, and Fig. 3 is a side elevation of the device with the incased actuating mechanism shown in substantially central section.

Except that it be conspicuously positioned, it is not material to the present invention at just what location or on just what particular part of the vehicle the signaling device is mounted. For the purpose of this description, I have shown in Fig. 1 a portion 7 of the rear end of an automobile with the device of my invention mounted upon the crown of the left rear-wheel mud-guard 8, in which location it would be, when in signaling position, as shown, conspicuously visible from the rear of the car, but otherwise sufficiently inconspicuous as to avoid unsightliness.

A practical and convenient embodiment of my invention comprises a two-part, substantially cylindrical, sheet-metal shell or casing, the lower part 9 of which I have shown screwed to a bracket 10 adapted to be riveted, bolted or otherwise suitably secured to the crown of one—preferably the left—rear mud-guard 8, although it will be apparent that the form or contour of the bracket 10 may be readily modified to permit of the mounting of the device in any one of many different locations. This lower casing portion 9 is screw threaded for the reception of the correspondingly screw-threaded upper portion 11, whereby said portions may be easily and readily secured together after assembly of the working parts therein. Axially located apertures are punched in each of the casing portions whereby flanges are struck up which when finished provide bearings for the vertical shaft or post 12 which rests upon the flat face of the bracket 10.

Carried by the post 12 and extending laterally therefrom is the flag-like plate 13. I have shown this plate secured to the post by slotting the upper portion of the latter and inserting one end of the plate in the slot, where it is riveted, but it will be apparent that there are many other ways in which these parts may be suitably joined. What may be termed the rear side of the plate may display any desired word or symbol of warning or caution. For the purpose of this description, I have selected the word "Look" as being as well adapted as any other to put the driver of a following vehicle on his guard. This plate 13 is intended to be rotated by the post 12 through an arc of 90°, or one quarter turn, between a position in which the end edge of said plate is directed toward the rear of the machine, as indicated in Figs. 2 and 3, and a position in which the lettered side of said plate is directed toward the rear of the machine, as shown in Fig. 1. In the first of said positions, obviously, no signal is understood to be conveyed; in the second position, the word "Look" is conspicuously displayed, and the driver of a following vehicle is made to understand that a change in speed or direction is contemplated.

Rotatively mounted on the annular flange around the central aperture in the lower casing-portion 9 within the shell or casing and keyed to the post 12 in a manner which will be described is the sheave or sheave-sector 14, reduced in diameter on one side to provide the shoulder stops 15 and 16, located diametrically opposite each other. Struck up from the bottom of the lower part 9 of the casing are lugs 17 and 18 adapted to engage the shoulder stops 15 and 16, respectively, and so located as to check movement of said sheave, and consequently of the post 12, in each of the two positions to which I have referred—that is to say, with the signal in distinctive and indistinctive positions, respectively. To another lug 19 is secured the end of a coil-spring 20 in tension between said lug and a suitable anchorage at the edge of the sheave 14, whereby the shoulder stop 16 is yieldingly held against the lug 18, under which conditions the signal plate 13 is in the position indicated in Figs. 2 and 3, the edge thereof being directed toward the rear of the car. The sheave-sector is grooved, as shown, for the reception of a cord 21, the end of which is suitably secured to the sheave at the far end of the groove. This cord passes around the grooved sector, through a suitable aperture 22 in the bottom of the lower part 9 of the casing, and thence to any desired point—preferably being directed underneath the car and thence to a point within convenient reach of the driver or chauffeur.

It will be seen that the signal is normally yieldingly held in edgewise or indistinctive position, and that when the cord 21 is pulled, the post 12 will be rotated against the action of the spring 20 and the signal turned to sidewise or distinctive position, movement being checked at the proper point, where it is held for such period of time as may be desired, being automatically returned to indistinctive position by the spring 20 the moment the cord is released.

As a simple means of retaining the post 12 in its bearings in the casing and at the same time connecting said post with the sheave 14, I slot the lower end of said post and insert in the slot a small plate or key 25, secured in position by means of a pin 26 and butting against the top of the casing. A seat or socket is provided in the top face of the sheave for the lower edge of said plate or key 25 which fits snugly therein.

I have shown the signal plate 13 provided with a flange 23 which extends throughout the top and end edges thereof. This is to facilitate illumination of the signal at night yet substantially prevent egress of the light rays when the signal is in indistinctive position. I have shown an electric lamp 24 mounted on the end flange, the feed wires for which may form a shunt circuit from the usual lighting circuit of the modern automobile.

Many modifications of minor details of my improved signaling device will doubtless readily suggest themselves to those skilled in the art to which it appertains, and I therefore do not desire to limit my invention to the specific construction herein shown and described.

I claim:

1. A rear signaling device for vehicles comprising a casing adapted to be mounted in conspicuous location at the rear of the vehicle, a rotatable post having bearings in and projecting from said casing, a significative wing-like plate carried by said post, a sheave within said casing, means which at the same time connect said sheave and said post and serve to retain said post in its bearings in said casing, a spring adapted to yieldingly retain said sheave and therefore said post in such rotative position that the edge of said plate is presented toward the rear of said vehicle, a cord or the like associated with said sheave and passing through said casing whereby said post may be rotated from a point remote therefrom against the action of said spring, and means for checking such rotation when the flat side of said plate is presented toward the rear of said vehicle.

2. In a rear signaling device for vehicles, the combination, with a suitable flat support, of a separable, two-part, substantially cylindrical, sheet-metal casing, axially located flanged apertures in said casing, a rotatable post for which the flanges form bearings passing through said apertures and resting upon said support, a significative wing-like plate carried by said post exteriorly of said casing, a sheave rotatably mounted within said casing, means which at the same time connect said sheave and said post and serve to retain the latter in its bearings in said casing, a spring associated with said sheave to yieldingly retain said sheave and therefore said post in such rotative position that the edge of said plate is presented toward the rear of said vehicle, a cord or the like associated with said sheave and passing through an aperture in said casing whereby said post may be rotated from a point remote therefrom against the action of said spring, and means for checking such rotation when the flat side of said plate is presented toward the rear of said vehicle.

3. In a rear signaling device for vehicles, the combination, with a suitable flat support, of a separable, two-part, substantially cylindrical, sheet-metal casing, axially located flanged apertures in said casing, a rotatable post for which the flanges form bearings passing through said apertures and resting upon said support, a significative wing-like plate carried by said post exteriorly of said casing, a sheave rotatively mounted within said casing, the portion of said post within said casing being provided with a slot and the upper side of said sheave being provided with a groove, a key passing through said slot and being seated in said groove whereby said post and said sheave are connected and at the same time said post retained in its bearings in said casing, a spring associated with said sheave and tending to rotate the same in one direction, a cord or the like associated with said sheave and passing through an aperture in said casing whereby said post may be rotated from a point remote therefrom against the action of said spring, and stops within said casing coöperating with shoulders on said sheave to check rotation of the latter in one direction when the flat face of said plate is presented toward the rear of the vehicle and in the other direction when the edge of said plate is so presented.

In testimony of the foregoing, I have hereunto set my hand in the presence of two subscribing witnesses.

FREDERICK C. S. KNOWLES.

Witnesses:
F. H. BOWERSOCK,
F. P. BOWERSOCK.